United States Patent
Olwal et al.

(10) Patent No.: US 12,142,185 B2
(45) Date of Patent: Nov. 12, 2024

(54) HIDDEN DISPLAY INTERFACES AND ASSOCIATED SYSTEMS AND METHODS

(71) Applicant: Google LLC, Mountain View, CA (US)

(72) Inventors: Alex Olwal, Mountain View, CA (US); Artem Dementyev, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/569,022

(22) Filed: Jan. 5, 2022

(65) Prior Publication Data
US 2022/0246081 A1 Aug. 4, 2022

Related U.S. Application Data

(60) Provisional application No. 63/133,957, filed on Jan. 5, 2021.

(51) Int. Cl.
*G09G 3/20* (2006.01)
*G06T 11/20* (2006.01)
*G09G 3/3216* (2016.01)

(52) U.S. Cl.
CPC .......... *G09G 3/2085* (2013.01); *G06T 11/203* (2013.01); *G09G 3/3216* (2013.01); *G09G 2340/14* (2013.01); *G09G 2354/00* (2013.01)

(58) Field of Classification Search
CPC ............... G09G 6/2085; G09G 2/3216; G09G 2340/14; G09G 2354/00; G09G 3/2085; G09G 3/3216; G09G 2310/0205; G09G 2360/08; G06T 11/203
See application file for complete search history.

(56) References Cited

U.S. PATENT DOCUMENTS

| | | | | |
|---|---|---|---|---|
| 6,693,639 | B2 * | 2/2004 | Duluk, Jr. ............... | G06T 15/83 345/506 |
| 9,607,352 | B2 * | 3/2017 | Yang ........................ | G06T 1/60 |
| 9,767,600 | B2 * | 9/2017 | Bolz ...................... | G06T 11/203 |
| 2002/0196251 | A1 * | 12/2002 | Duluk, Jr. ............. | G06T 11/001 345/420 |

(Continued)

FOREIGN PATENT DOCUMENTS

| | | | | |
|---|---|---|---|---|
| CN | 1430769 A | * | 7/2003 | ........... G06T 15/005 |
| CN | 107277500 A | * | 10/2017 | ............. H04N 17/00 |

(Continued)

OTHER PUBLICATIONS

International Search Report and Written Opinion dated May 16, 2022 in International Patent Application No. PCT/US2022/011260.

(Continued)

*Primary Examiner* — Ricardo Osorio
(74) *Attorney, Agent, or Firm* — Kilpatrick Townsend & Stockton LLP

(57) ABSTRACT

Subsurface display interfaces and associated systems and methods are provided. In some embodiments, an example method can include: dividing a graphic to be displayed into a plurality of sets of primitives, each primitive of the sets of primitives comprising a rectangle or a line; assigning the plurality of sets of primitives to display frames of a plurality of display frames; and outputting, at a display positioned under a surface and in series, the plurality of display frames.

19 Claims, 13 Drawing Sheets

(56) References Cited

U.S. PATENT DOCUMENTS

| | | | |
|---|---|---|---|
| 2007/0038939 A1* | 2/2007 | Challen | G05B 15/02 |
| | | | 700/1 |
| 2008/0231610 A1 | 9/2008 | Hotelling et al. | |
| 2010/0110065 A1 | 5/2010 | Abe | |
| 2010/0156949 A1* | 6/2010 | Park | G09G 3/3607 |
| | | | 345/99 |
| 2010/0228781 A1* | 9/2010 | Fowler | G06T 11/40 |
| | | | 707/791 |
| 2014/0028734 A1* | 1/2014 | Fujishiro | G09G 3/2003 |
| | | | 345/87 |
| 2014/0267366 A1* | 9/2014 | Bolz | G06T 15/503 |
| | | | 345/593 |
| 2014/0347357 A1* | 11/2014 | Kim | G06T 11/40 |
| | | | 345/420 |
| 2015/0097853 A1* | 4/2015 | Bastani | G09G 5/10 |
| | | | 345/589 |
| 2015/0178881 A1 | 6/2015 | Qian et al. | |
| 2018/0074199 A1* | 3/2018 | Lin | G09G 3/3225 |
| 2018/0293424 A1* | 10/2018 | Venkataraman | G09G 5/10 |
| 2019/0327832 A1 | 10/2019 | Holbery et al. | |
| 2020/0265778 A1* | 8/2020 | Lee | G09G 3/32 |
| 2020/0270777 A1 | 8/2020 | Podhajny et al. | |
| 2021/0134216 A1* | 5/2021 | Huang | G09G 3/3208 |

FOREIGN PATENT DOCUMENTS

| | | | | |
|---|---|---|---|---|
| CN | 108694072 A | * | 10/2018 | G06F 9/45504 |
| CN | 108734634 A | * | 11/2018 | G06F 15/167 |
| DE | 102018132468 A1 | * | 7/2019 | G06G 12/1009 |
| DE | 102019007745 A1 | * | 5/2021 | |
| EP | 2254109 | | 11/2010 | |
| EP | 2254109 A1 | * | 11/2010 | G09G 3/3216 |
| EP | 3385838 A1 | * | 10/2018 | G06F 3/1423 |
| TW | 202110174 A | * | 3/2021 | G02B 27/0093 |
| TW | I728986 B | * | 6/2021 | |

OTHER PUBLICATIONS

Poupyrev, I., et al., "Project Jacquard: Interactive Digital Textiles at Scale", In Proceedings of the CHI Conference on Human Factors in Computing Systems, San Jose, CA, US, May 7-12, 2016, pp. 4216-4227.

* cited by examiner

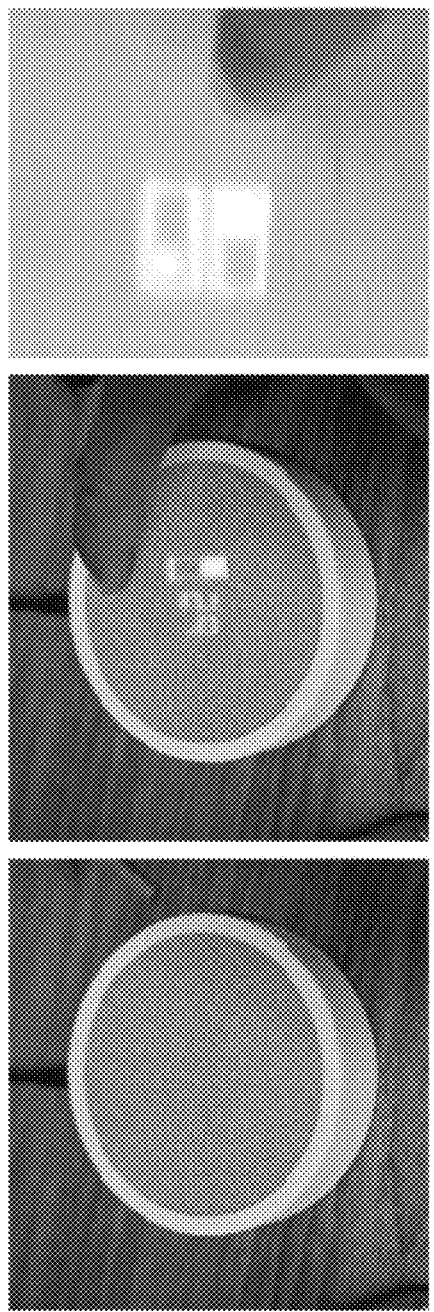
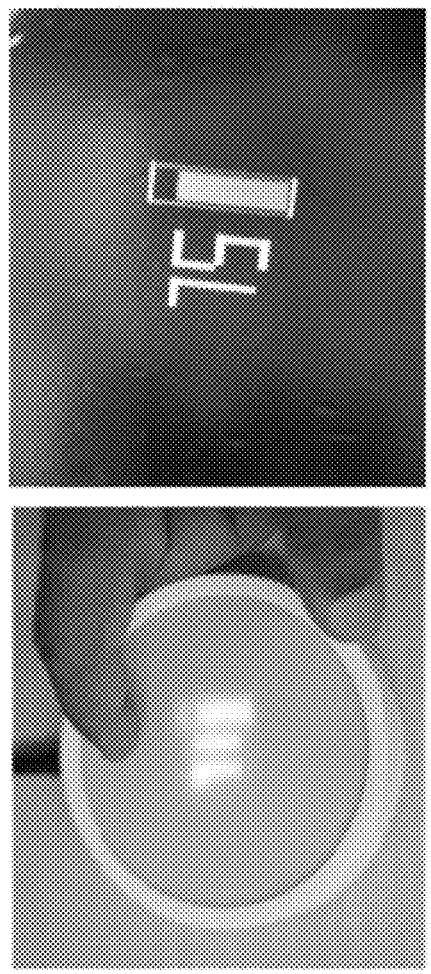
FIG. 3A   FIG. 3B   FIG. 3C   FIG. 3D   FIG. 3E

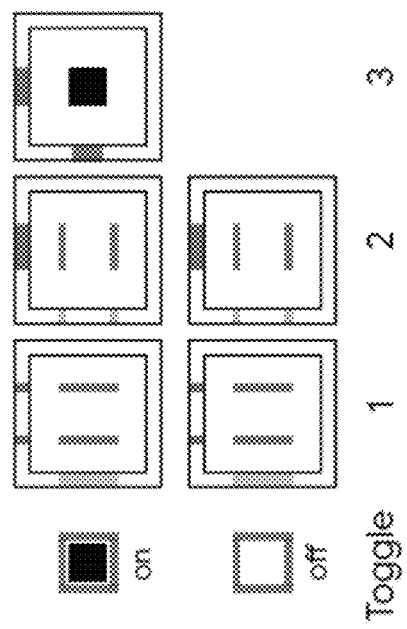
FIG. 4A
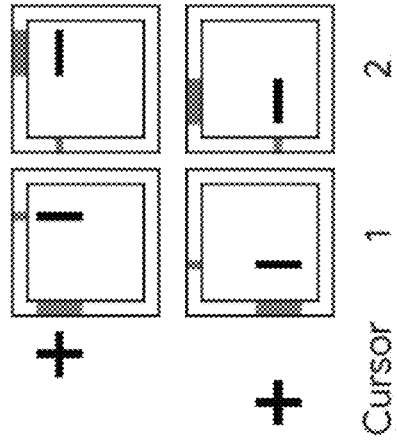
FIG. 4B
FIG. 4C
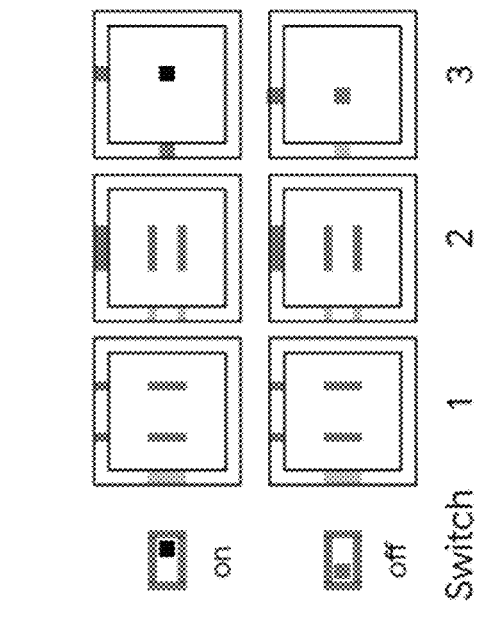
FIG. 4D

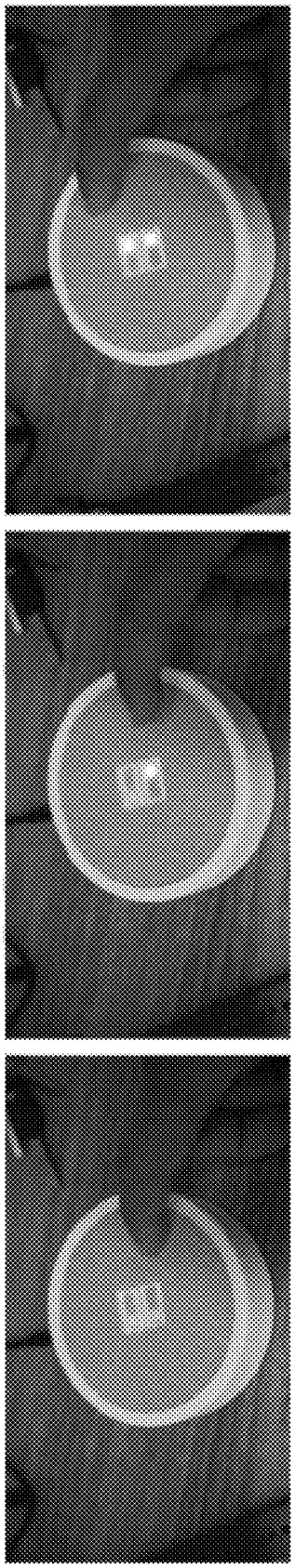

HIDDEN DISPLAY INTERFACES AND ASSOCIATED SYSTEMS AND METHODS

CROSS-REFERENCE TO RELATED APPLICATIONS

This application claims the benefit of U.S. Provisional Patent Application No. 63/133,957, filed Jan. 5, 2021, which is hereby incorporated by reference herein in its entirety.

BACKGROUND

Computing devices, such as smartphones, laptops, ambient computing devices, and tablets, may include displays capable of outputting data for observation by users. However, in some examples, displays may visually stand out from their environments, which may be undesirable.

SUMMARY

Consumer electronics are increasingly using traditional materials to allow technology to better blend into everyday environments. Specifically, transmissive materials may enable emissive displays to disappear when turned off, and appear when turned on. However, covering displays (e.g., with textile meshes, veneer, one-way mirrors, or translucent plastics) may greatly limit the display brightness of typical graphical displays.

In accordance with one or more techniques of this disclosure, a computing device may utilize rectilinear rendering to display graphical user interfaces through transmissive materials. For instance, one or more processors of the computing device may decompose a graphic to be displayed into rectilinear primitives (e.g., rectangles and/or lines that are to be displayed as axially aligned with rows or columns of a display of the computing device). The one or more processors may assign the primitives to various display frames, and cause the display to display the frames in series. As discussed below, utilizing rectilinear rendering in this way may enable a reduction in the quantity of frames used to display a graphic. As such, in this way, an apparent brightness of the graphic may be desirably increased.

In accordance with some embodiments of the disclosed subject matter, a method for providing subsurface display interfaces can be provided, the method comprising: dividing a graphic to be displayed into a plurality of sets of primitives, each primitive of the plurality of sets of primitives comprising a rectangle or a line; assigning the plurality of sets of primitives to display frames of a plurality of display frames; and outputting, at a display positioned under a transmissive material and in series, the plurality of display frames.

In some embodiments, the display includes a passive organic light emitting diode (OLED) display.

In some embodiments, a quantity of display frames in the plurality of display frames is less than a quantity of rows of pixels in the display.

In some embodiments, outputting a particular display frame of the plurality of display frames comprises causing the display to simultaneously illuminate multiple pixels in a particular column of pixels.

In some embodiments, outputting a particular display frame of the plurality of display frames comprises causing the display to simultaneously: illuminate multiple pixels in a particular column of pixels; and illuminate pixels in multiple rows of pixels.

In some embodiments, outputting a single display frame takes N milliseconds, and wherein a total time used to output all of the plurality of display frames is less than $N*X$, where X is a quantity of rows in the display.

In accordance with some embodiments of the disclosed subject matter, a computing device for providing subsurface display interfaces can be provided, the computing device comprising a display and one or more processors coupled to the display, wherein the one or more processors are configured to: divide a graphic to be displayed into a plurality of sets of primitives, each primitive of the plurality of sets of primitives comprising a rectangle or a line; assign the plurality of sets of primitives to display frames of a plurality of display frames; and output, at the display positioned under a transmissive material and in series, the plurality of display frames.

In accordance with some embodiments of the disclosed subject matter, a non-transitory computer-readable medium containing computer executable instructions that, when executed by a processor, cause the processor to execute a method for providing subsurface display interfaces can be provided, the method comprising: dividing a graphic to be displayed into a plurality of sets of primitives, each primitive of the plurality of sets of primitives comprising a rectangle or a line; assigning the plurality of sets of primitives to display frames of a plurality of display frames; and outputting, at a display positioned under a transmissive material and in series, the plurality of display frames.

In accordance with some embodiments of the disclosed subject matter, a computing device for providing subsurface display interfaces can be provided, the computing device comprising: means for dividing a graphic to be displayed into a plurality of sets of primitives, each primitive of the plurality of sets of primitives comprising a rectangle or a line; means for assigning the plurality of sets of primitives to display frames of a plurality of display frames; and means for outputting, at a display positioned under a transmissive material and in series, the plurality of display frames.

The details of one or more aspects of this disclosure are set forth in the accompanying drawings and the description below. Other features, objects, and advantages of the disclosure will be apparent from the description and drawings, and from the claims.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 3A-3E are images illustrating various subsurface interfaces rendered with rectilinear primitives, in accordance with one or more techniques of this disclosure.

FIGS. 4A-4D are conceptual diagrams illustrating rendering of various user interfaces using rectilinear primitives, in accordance with one or more techniques of this disclosure.

FIGS. 6A-6C are images illustrating an example implementation of toggle and switch, two controls for selections, in accordance with one or more techniques of this disclosure.

DETAILED DESCRIPTION

Figure 1:
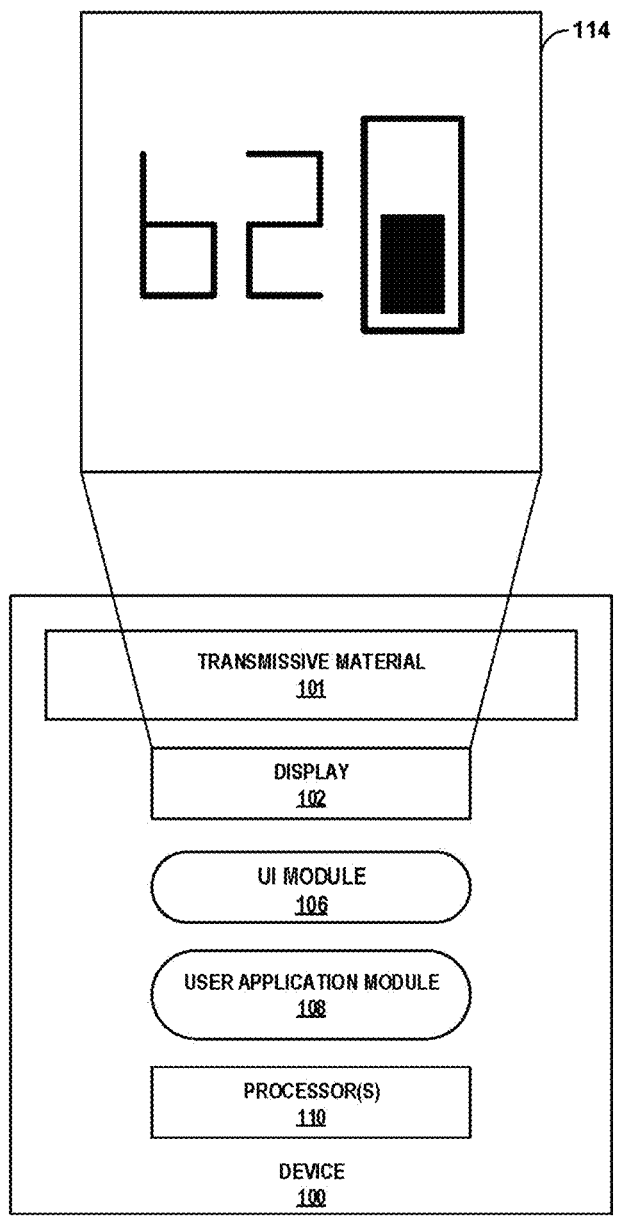
FIG. 1 is a block diagram illustrating a device that utilized rectilinear rendering to display graphical user interfaces through transmissive material, in accordance with one or more techniques of this disclosure.

In recent years, there has been increases in various types of Internet-connected devices that offer functionality such as remote control, music playback, voice assistance, and home automation. A graceful integration of this technology may be facilitated via respecting existing aesthetics, social forms, and adaptation to user's styles. There has thus been an increasing desire to create smart objects and appliances, which can preserve the industrial design and aesthetics of traditional materials, while providing access to interaction and digital display on demand.

Today's interactive devices tend to fall into two categories. One category is devices with no or minimal displays, where the main interaction is performed through an app on a mobile device, or using speech and audio responses. The other category is devices with more high-fidelity displays that may be capable of accepting touch input. A characteristic of the latter is that digital screens may create tensions with environments that emphasize traditional materials, and when turned off, their black screens may become "black holes" in the physical space.

To enable expressive interactions with graphical displays without these tradeoffs, strategies have been developed to realize displays that can disappear. "Smart mirrors" use partially reflective material to hide a display underneath, while making it possible to display graphics when turned on. Products have also used frosted, translucent material to show simple diffuse graphics, but projecting through surfaces may also distort and absorb light, depending on the material properties. Today's brightest displays may be expensive as they are designed for high quality. As such, it may not be desirable to cover expensive displays that are designed for high quality. The typical rendering strategies for low-cost displays on the other hand, may not be sufficiently effective in generating the amount of light that is needed to pass through the transmissive materials that could hide them.

To address this challenge, smart speakers may utilize textile coverings with special purpose illumination. For instance, smart speakers may employ high-brightness LEDs underneath textiles to provide abstract indicators (e.g., Google Home Mini), 7-segment displays to show time (e.g., Sony LF0S50G Wireless Speaker) or to illuminate fixed icons (e.g., Withings Aura). However, these special-purpose displays may not sufficiently expressive to enable reconfigurable user interfaces with graphical elements, scalable vector graphics and typography.

This disclosure proposes a new approach to enable emissive graphical displays to be hidden under traditional materials with transmissive properties. The disclosed approach enables graphical displays to appear for on-demand interaction and otherwise be reduced to zero visibility. To enable high-brightness graphics, a device may implement rendering of user interface primitives that are constrained to rectilinear geometries. Examples of rectilinear geometries/primitives may include straight, axis-aligned lines or rectangles. In contrast to circles or diagonals, axis-aligned rectangles may enable the use of optimized display driver mechanisms to parallelize the rendering of multiple columns and rows, which may greatly improve light output. In some examples, devices that use rectilinear rendering of graphical displays through transmissive materials may include input components, such as touch or presence sensitive components, capable of receiving user input at the graphical displays.

FIG. 1 is a block diagram illustrating a device that utilizes rectilinear rendering to display graphical user interfaces through transmissive material, in accordance with one or more techniques of this disclosure. As shown in FIG. 1, device 100 includes transmissive material 101, display 102, user interface (UI) module 106, user application module 108, and one or more processors 110 ("processors 110"). In the example of FIG. 1, device 100 can be any device that includes a display. Examples of device 100 include, but are not limited to, an ambient computing device, a thermostat, a an appliance, a mobile phone, a camera device, a tablet computer, a display, a laptop computer, a desktop computer, a gaming system, a media player, an e-book reader, a television platform, a vehicle infotainment system or head unit, or a wearable computing device (e.g., a computerized watch, a head mounted device such as a virtual reality/augmented reality (VR/AR) headset, computerized eyewear, a computerized glove).

Display 102 may be capable of rendering data into images viewable by a user of device 100. For example, display 102 may include a matrix of pixels that are arranged into rows and columns. Examples of display 102 include, but are not limited to, liquid crystal displays (LCD), light emitting diode (LED) displays, passive organic light-emitting diode (OLED) displays (including, for example, active-matrix organic light-emitting diode (AMOLED)), microLED displays, or similar monochrome or color displays capable of outputting visible information to a user of device 100. In some examples, display 102 may be a presence-sensitive display capable of detecting user input.

Device 100 may include modules 106 and 108. Modules 106 and 108 may perform operations described using software, hardware, firmware, or a mixture of hardware, software, and/or firmware residing in and/or executing at device 100. Device 100 may execute modules 106 and 108 with one or more processors. Device 100 may execute modules 106 and 108 as a virtual machine executing on underlying hardware. Modules 106 and 108 may execute as a service or component of an operating system or computing platform. Modules 106 and 108 may execute as one or more executable programs at an application layer of a computing platform. Modules 106 and 108 may be otherwise arranged remotely to and remotely accessible to device 100, for instance, as one or more network services operating at a network in a network cloud.

UI module 106 manages user interactions with display 102 and other components of device 100. In other words, UI module 106 may act as an intermediary between various components of device 100 to make determinations based on user input detected by display 102 and cause display 102 to generate output in response to the user input. UI module 106 may receive instructions from an application, service, platform, or other module of device 100 to cause display 102 to output a user interface. UI module 106 may manage inputs received by device 100 as a user views and interacts with the user interface presented at display 102 and update the user interface in response to receiving additional instructions from the application, service, platform, or other module of device 100 that is processing the user input.

User application module 108 may execute at device 100 to perform any of a variety of operations. Examples of user application module 108 include, but are not limited to, operating systems, music applications, photo viewing applications, mapping applications, electronic message applications, chat applications, Internet browser applications, social media applications, electronic games, menus, and/or other types of applications that may operate based on user input.

Processors 110 may implement functionality and/or execute instructions within device 100. Examples of processor(s) 110 include, but are not limited to, one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein.

In operation, user application module 108 may cause display 102 to present graphical user interface (GUI) 114. For instance, as shown in the example of FIG. 1, user application module 108 may be a music application that outputs instructions to UI module 106 that cause UI module 106 to render graphical user interface 114 and output the rendered GUI for output at display 102 (e.g., to indicate that a current volume setting is 62%).

Device 100 may include transmissive material 101, which may be positioned between pixels of display 102 and a user of device 100. As such, light emitted by display 102 may pass through, and be influenced by, transmissive material 101 prior to being observed by the user of device 100. Example of transmissive material 101 include, but are not necessarily limited to, plastic, acrylic, textile, glass (e.g., with or without mirror finish), wood, veneer, or any other material capable of transmitting light.

As the light emitted by display 102 passes through, and is disturbed by, transmissive material 101 prior to being observed by a user of device 100, GUIs displayed at display 102 may appear differently when viewed through transmissive material 101 (i.e., as opposed to being viewed directly from display 102 if transmissive material 101 was not present). The disturbance to the GUIs may present one or more disadvantages. For instance, the disturbances may cause a reduction in brightness of the GUIs, which may adversely affect user experience.

In accordance with one or more techniques of this disclosure, device 100 may utilize rectilinear rendering when outputting GUIs via display 102. For instance, UI module 106 may receive, from an application module of application modules 108, a graphic to be displayed. UI module 106 may divide the graphic into a plurality of sets of primitives and assign the plurality of sets of primitives to display frames of a plurality of display frames. Each of the primitives may be a rectangle or a line. UI module 106 may cause display 102 to output, in series, the plurality of display frames. UI module 106 may cause display 102 to repeatedly loop over the plurality of display frames. For instance, where the plurality of frames includes a first frame A, a second frame B, and a third frame C, UI module 106 may cause display 102 to display the frames as A, B, C, A, B, C, A, B, C, . . . until a different graphic is to be displayed or display 102 is to be turned off.

As discussed in further detail below, by using rectilinear rendering (e.g., dividing the graphic into the sets of primitives), UI module 106 may reduce the quantity of display frames needed to output the graphic. For instance, rectilinear rendering may enable device 100 to output the graphic using a quantity of frames less than a number of rows in display 102. By reducing the quantity of frames used to output the graphic, UI module 106 may reduce the amount of time between successive outputting of frames. Reducing the amount of time between successive outputting of frames may increase an apparent brightness of a graphic from which the frames are generated. As noted above, due to the reduction in brightness caused by transmissive material 101, such an increase in brightness may be desirable.

As opposed to the limited expressivity of the aforementioned technologies, the techniques of this disclosure enable a larger range of expressivity. For instance, a display (e.g., display 102) may have 128×96 resolution, giving more than 12,000 individually controllable LEDs in a dense arrangement.

Some display rendering techniques may focus on environmental light correction, which may be important with transparent displays. Another focus area is the improvement of image quality, such as resolution, contrast, brightness, and depth of field. Some of those techniques employed custom hardware. For example, by using multi-layer LCD display to increase resolution and depth of field, or projected modulated light for illumination to create High Dynamic Range (HDR) images. Custom displays may be expensive to produce at scale—thus, there may be advantages to leveraging inexpensive off-the-shelf displays. Computational techniques may include using image decomposition to improve image quality.

Today's consumer devices mostly employ different types of active-matrix organic light-emitting diode (AMOLED) displays. AMOLED displays may provide high-quality, flicker-free graphics due to all pixels having dedicated memory, which may allow them to maintain per-pixel state.

Figure 2A:
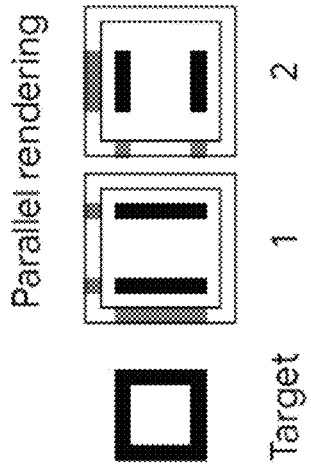
FIG. 2A is a conceptual diagram illustrating parallel rendering, in accordance with one or more aspects of this disclosure.
Figure 2B:
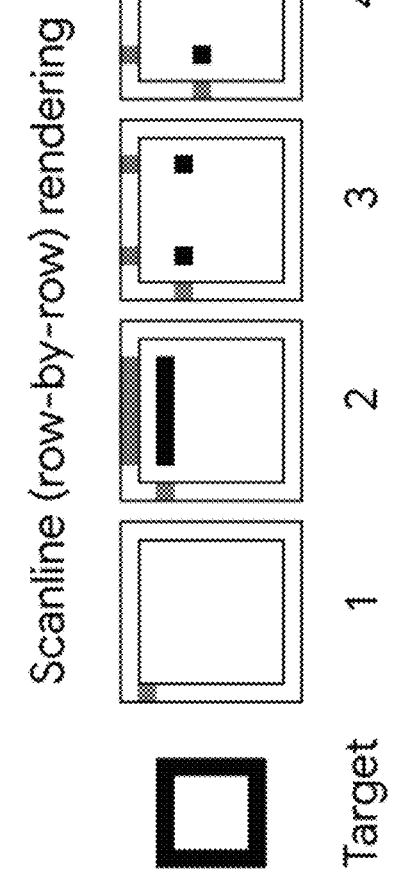
FIG. 2B is a conceptual diagram illustrating row-by-row rendering.

The predecessor to AMOLEDs, passive OLEDs, are based on a simpler design without per-pixel memory. While this greatly reduces manufacturing costs and complexity, it may require active display driver circuitry. The display driver runs an update loop to select columns and power rows, which controls how current flows through and illuminates specific pixels. To display general-purpose content, current display drivers may inspect their framebuffer using the scanline technique (row-by-row), and select which columns to activate for the row. For each frame update, they thus need to iterate through all rows for the height of the display. This also means that only one row has pixels turned on at any given time, which limits the instantaneous display brightness to the luminance of 1 row of pixels (width×per-pixel luminance). The vertical temporal multiplexing can also introduce flicker since all except one row are always turned off. FIG. 2B is a conceptual diagram illustrating scanline rendering. As shown in FIG. 2B, each row is separately displayed, which may limit the brightness given that at most one row can be illuminated at any given time.

In accordance with one or more techniques of this disclosure, similarly to how multiple columns can be selected, multiple rows may be simultaneously enabled. Simultaneously enabling multiple rows may result in the same pattern on each row. As opposed to diagonal lines or circles, such parallel powering (enabling) of multiple rows can be applied to rectilinear, axis-aligned geometry, such as rectangles and lines, where content is repeated across rows. FIG. 2A shows how a rectangle outline can be rendered with just two operations, when parallel rendering can activate all similar rows. As shown in FIG. 2A, parallel rendering may involve simultaneous activation of multiple rows to take advantage of redundancies in rectilinear graphics, which may reduce the quantity of frames needed to render a graphic. As shown in FIG. 2B, the corresponding scanline version may need a frame for each row, resulting in as many operations (e.g., frames) as there are rows (display height operations).

In some examples, a device may output different frames at different brightness levels (e.g., through variation of the voltage differential between rows and columns). FIG. 3C shows how slide switches under veneer may be rendered dim when off (top) and brighter when on (bottom).

There may be both temporal and spatial advantages to this approach of parallel rendering. The speed-up can eliminate flicker, since there are fewer periods when pixels are turned off. Additionally, as noted above, the techniques of this disclosure may provide increased brightness, given that more areas of the display can be illuminated in each frame, compared to only a single row for scanline rendering.

Utilizing rectilinear graphics may take advantage of the parallel rendering of multiple rows as they may provide significant efficiency given the redundancy across rows and columns. The designer can balance desired display brightness with the number of onscreen elements, and may take advantage of aligned graphics to exploit redundancies for parallelization. The parallelization may also benefit from rectilinear redundancies to support arbitrary stroke thickness and effects, such as overlapping geometry (See FIG. 3E, one-way mirror, rightmost example). Example graphical user interfaces (GUIs) that may be particularly suited for rendering using rectilinear graphics may include, but are not limited to, basic controls, such as light switches, volume controls and thermostats.

Rectangles and lines form basic elements, which can be rendered effectively with just one or two operations, as shown in Table 1. For these simple primitives we obtain a speed-up of (0.5 to 1)×the display height (h) compared to the scanline approach. On our 128×96-pixel display, a hollow rectangle and a filled rectangle, can thus appear 48× or 96× brighter, respectively. We can further compose these rectangles and lines to form a basic set of user interface controls for parallel rendering. See FIGS. 4A-4D which are conceptual diagrams illustrating various graphics rendered using rectilinear primitives. FIG. 4A illustrates a slider in both 100% and 50% positions, FIG. 4B illustrates a toggle in both on and off positions, FIG. 4C illustrates a switch in both on and off positions, and FIG. 4D illustrates a cursor at two different positions.

TABLE 1

Simple rectilinear primitives may require only 1 or 2 operations with parallel rendering, compared to the scanline technique, which may require iterations through all rows that make up the display height (h). Each operation may be referred to as a frame.

| Primitive | Parallel Rendering | Scanline (row-by-row) |
| --- | --- | --- |
| Solid rectangle | 1 operation | h operations |
| Hollow rectangle | 2 operations (horizontal + vertical lines) | |
| Vertical line | 1 operation | |
| Horizontal line | 1 operation | |

Figures 5A, 5B, 5C:
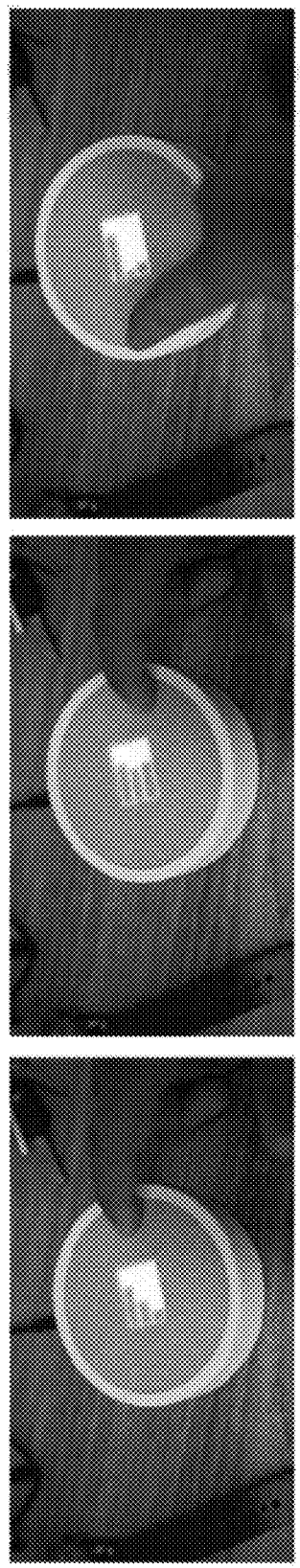
FIGS. 5A-5C are images illustrating a slider user interface (UI) element displayed through textile, in accordance with one or more techniques of this disclosure.
Figure 7A:
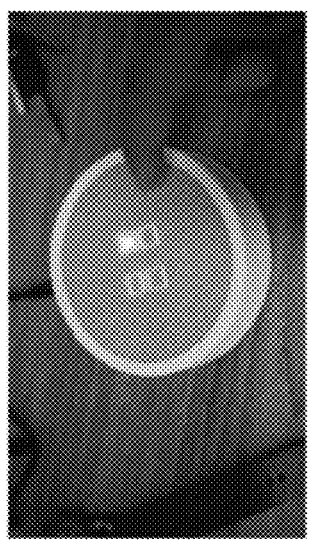
FIGS. 7A-7C are images illustrating an example implementation of a toggle checkbox UI element, in accordance with one or more techniques of this disclosure.
Figure 7B:
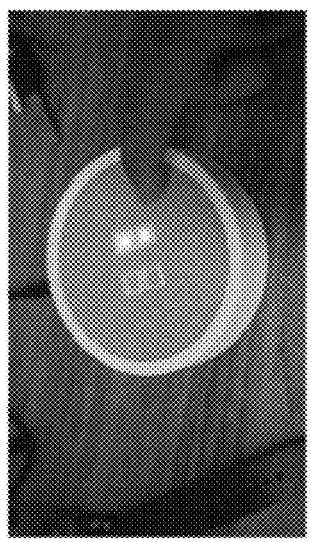
Figure 7C:
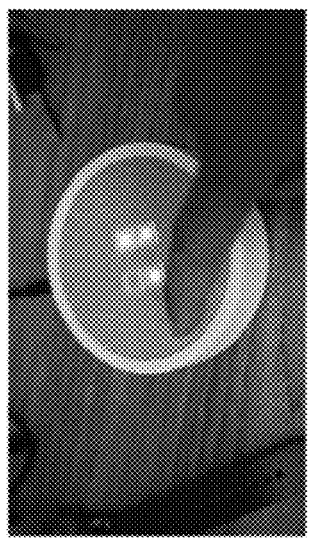

The vertical/horizontal slider is a widely used UI element. To control and visualize continuous parameters, like audio volume, a device may combine a darker hollow rectangle (outline), partially filled with a bright solid rectangle. See FIGS. 5A-5C which also show how we can leverage the ability to use different brightness levels across operations. In the example of FIGS. 5A-5C, the sliders may be displayed as moving to the left responsive to the device detecting user input on the left and vice versa. As shown in FIGS. 5A-5C, the sliders may comprise of a dark hollow rectangle and a bright solid rectangle. Per Table 1, composing a dark hollow rectangle and a solid fill may utilize three operations/frames. In some examples, the device can render with arbitrary line thickness, as adding thickness may result in redundant lines, which can be rendered in the same operation.

Additionally, a device may utilize multiple bars to visualize, e.g., audio spectrum during music playback or to control multiple parameters, such as color for a smart lightbulb, using RGB or HSV. The device may effectively render n sliders using 2+n operations/frames if the sliders are all aligned vertically or horizontally. The aligned outlines may be rendered in parallel using two operations, while each slider may require one individual operation for the rendering of its unique value.

FIGS. 6A-6C are images illustrating an example implementation of toggle and switch, two controls for selections, in accordance with one or more techniques of this disclosure. The toggle can be used to implement both checkboxes (multi-choice) and radio buttons (exclusive selection). The device can render the graphic with a dark hollow rectangle when not selected (two operations), and add a bright filled rectangle when selected (three operations). In one switch implementation, the device may utilize a dark outline. For instance, the device may fill the outline with a dark rectangle to the left when turned off, and with a bright rectangle to the right, when turned on.

Figure 8A:
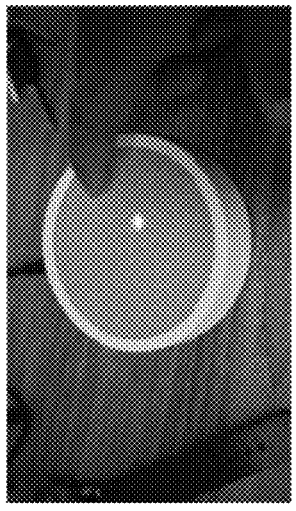
FIGS. 8A-8C are images illustrating an example implementation of a cursor UI element, in accordance with one or more techniques of this disclosure.
Figure 8B:
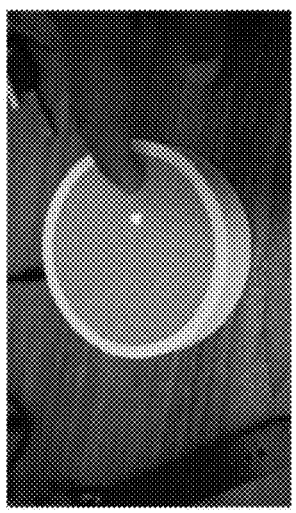
Figure 8C:
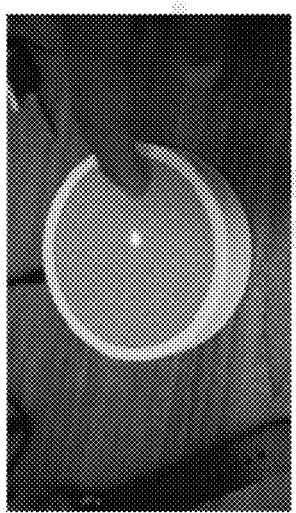

A 2D cursor could be useful for certain selections and controls. For example, for controlling the color channel for smart lights, the device could use the Y-axis for brightness, and X-axis for hue. To support such interactions, the device may use a crosshair, which can be rendered in two operations (horizontal line+vertical line). One example interaction with the cursor is shown in FIGS. 8A-8C.

Figure 9:
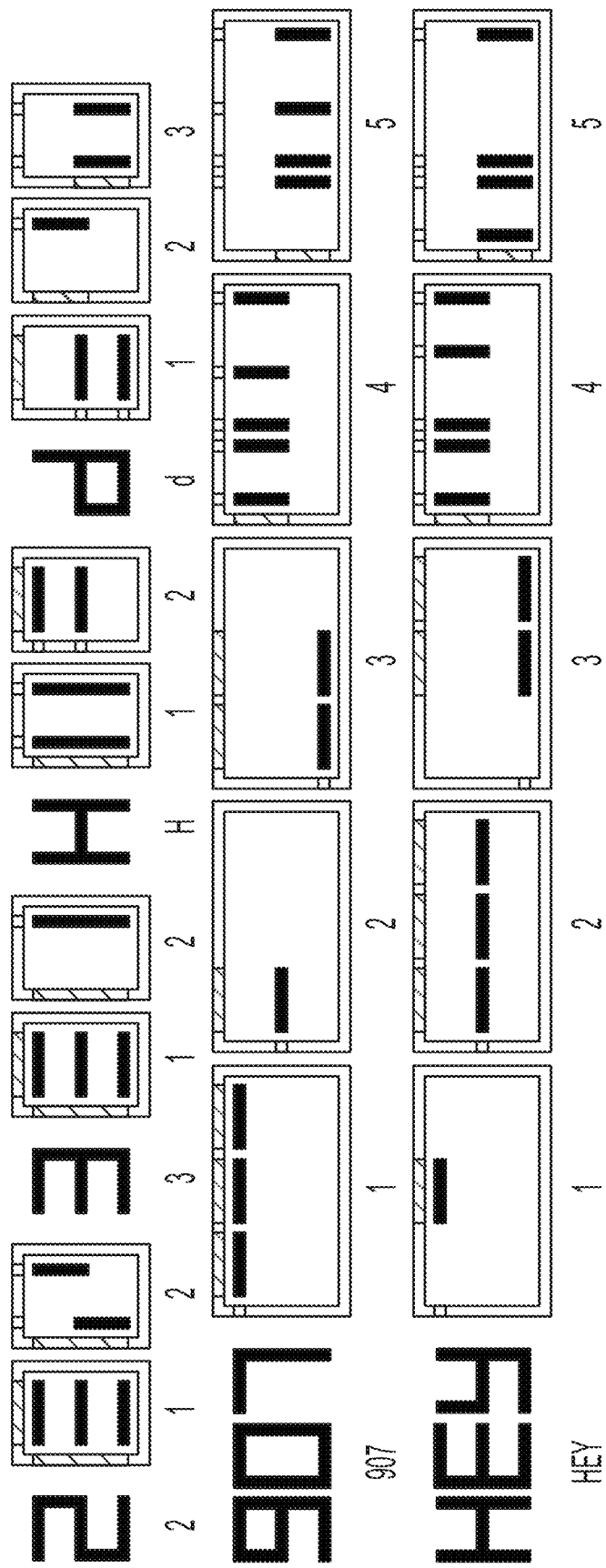
FIG. 9 is a conceptual diagram illustrating rectilinear primitive based rendering of character sequences, in accordance with one or more techniques of this disclosure.
Figure 10:
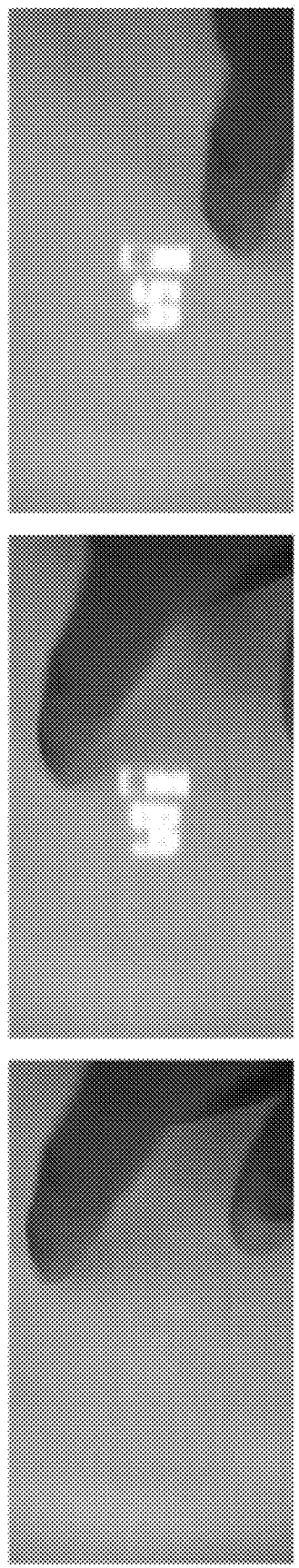
FIGS. 10A-10C are images illustrating an example implementation of a thermostat control UI element, in accordance with one or more techniques of this disclosure.

To support the display of texts and digits, the device may utilize a mechanism for optimized rendering of 7-segment characters. Rendering individual characters may require at most three operations, whereas a string of any length may require at most five operations (e.g., due to the redundancies across rows and columns). FIG. 9 shows how character sequences have at most three unique groups of horizontal strokes and at most two unique groups of vertical strokes. There may be no cost to introduce segments that align with existing groups, such as varying the stroke weight, for example FIG. 10 shows how a thicker font helps increase light output through veneer.

Figure 11:
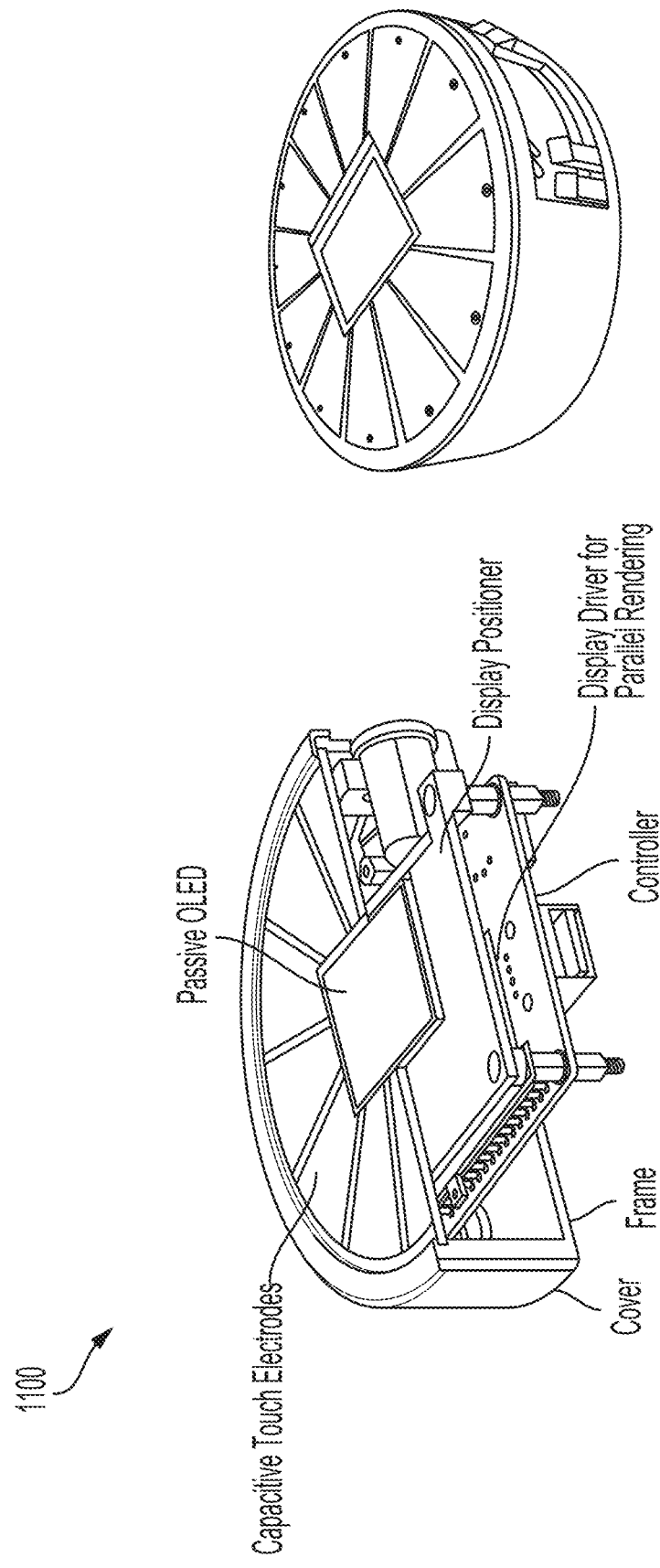
FIG. 11 is a conceptual diagram illustrating an example device that utilizes rectilinear rendering, in accordance with one or more aspects of this disclosure.

FIG. 11 is a conceptual diagram illustrating an example device that utilizes rectilinear rendering, in accordance with one or more aspects of this disclosure. As shown in FIG. 11, device 11 includes a passive OLED display with 128×96 resolution that has all rows and columns broken out to a flexible header. One difference between the display of device 1100 and off-the-shelf displays may be removal of the driver chip and routing all row/column drivers to a connector. Device 1100 may include fourteen 16-channel Digital-to-Analog Converters (DACs) to directly interface the 224 lines (14 DACs×16 channels=224 channels=128 columns+ 96 rows) from a controller over and interface (e.g., SPI). The controller may execute software to create each frame by writing row and column voltages to a framebuffer, which are then clocked out to the DACs.

For touch interaction, device 1100 may include a ring-shaped PCB surrounding the display with 12 electrodes arranged in arc segments. The electrodes may be connected to a proximity capacitive touch sensor controller, which may be interfaced over from the controller (e.g., via I2C).

A 3D-printed cylindrical enclosure may encapsulate components of device 1100. The enclosure may be designed to also hold in place different materials to allow characterization. Flexible materials, such as textile, can be stretched, whereas rigid materials may be cut into circular discs.

To evaluate the rectilinear rendering techniques, we characterize display performance through a set of common transmissive materials and compare with a state-of-the-art AMOLED display, as well as, the traditional scanline rendering approach.

To assess how well one example of the techniques of this disclosure enables hidden displays in traditional materials, we performed a technical characterization across different materials with transmissive properties. In particular, effects on brightness were quantified. The display was placed flush behind the transmissive materials and measured brightness on the other side. The brightness was measured with a light meter (e.g., in lux (lx), a unit that indicates light intensity as perceived by the human eye). The meter was placed 10 mm away from the display. Each measurement was taken five times, and the maximum measurement is reported in the study. Before each measurement, we obtained the baseline lx value with the display off to ensure it does not influence the data. The environmental light was kept dim to provide a mean of 0.2 lx, which is slightly above the light meter's minimum sensitivity.

Figures 12A, 12B, 12C, 12D, 12E, 12F, 12G:
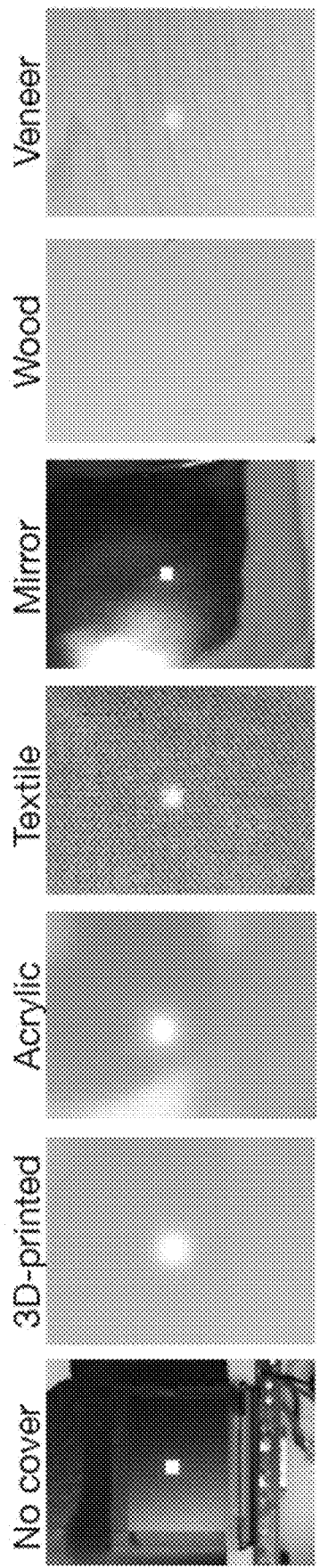
FIGS. 12A-12G are images illustrating graphics displayed through various transmissive materials, in accordance with one or more techniques of this disclosure.

We measured the brightness in the following conditions, as shown in FIGS. 12A-12G:

FIG. 12A—No cover material. (baseline)

FIG. 12B—Clear PETG (SainSmart PRO-3). 1 mm thickness. 3-D printed with 15% fill and 0.2 mm layers.

FIG. 12C—Acrylic. 1.5 mm thickness.

FIG. 12D—Textile. 0.4 mm thickness. Textile mesh, similar to the material commonly used in speakers.

FIG. 12E—One-way window film (HIDBEA) with mirror finish. 0.2 mm thickness.

FIG. 12F—Basswood sheet. 1.5 mm thickness.

FIG. 12G—Veneer. 0.5 mm thickness.

Since brightness may depend on the rendered contents, we performed our measurements using four variants of the shapes used for our rectilinear UI elements: Small filled (1) and unfilled (2) rectangles with size 3×3 mm, large filled (3), and unfilled (4) rectangles with size 15×15 mm. For the tests, the unfilled rectangles had a line thickness of 1 pixel.

As a baseline for comparison, we included a recent phone with an AMOLED display (Pixel 4, Google) where the Processing Java library was used to display the primitives. The screen brightness was set to maximum, and we used white color for the primitives and kept the other pixels turned off. We also implemented the scanline rendering algorithm for the passive OLED, which was our second baseline.

Figure 13:
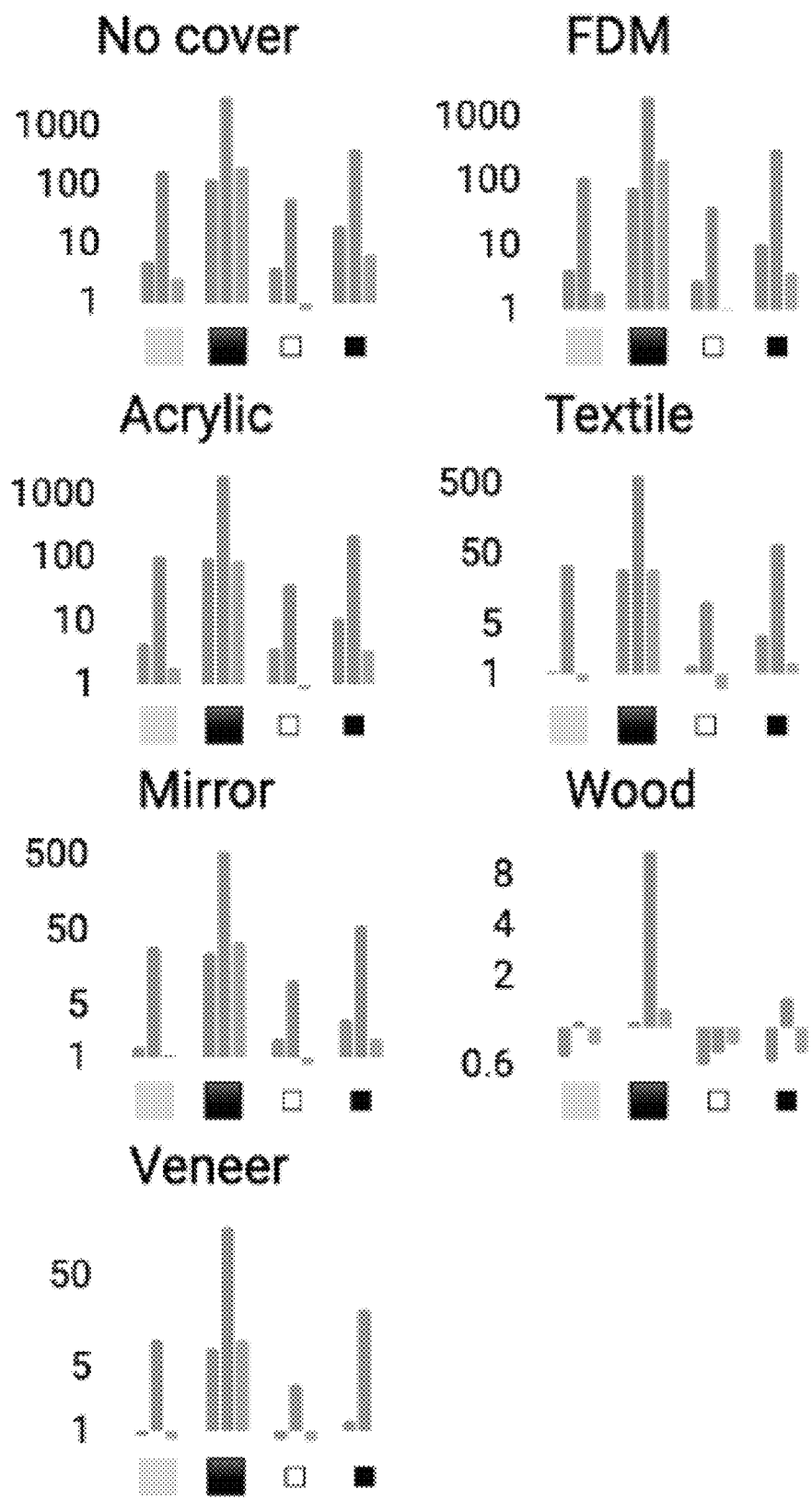
FIG. 13 is a set of graphs illustrating experimental results of displaying various graphics through various transmissive materials using various display technologies, in accordance with one or more aspects of this disclosure.

The rectilinear rendering was significantly brighter than the baseline scanline and state-of-the-art AMOLED display for all the materials in our experiments. The results are summarized in Tables 2-5 and FIG. 13. The rectilinear rendering was often 10× brighter or more for all the materials except for the 1.5 mm thick basswood sheet where the brightness difference was much smaller. The 1.5 mm basswood appeared to let very little light pass through. The thinner 0.5 mm wood veneer performed better. FIGS. 12A-12G show examples of how brightness, absorption and diffusion varies across the different materials for parallel rendering on the passive OLED.

The lux values observed for the large filled rectangle suggest that the rectilinear display can perform outside in sunlight. Outdoor displays need to have a brightness of 1570+ lx (500+ nits) [13]. The large filled rectangle provided 2000 lx for FDM 3D-printed material and acrylic.

The phone display performed similarly to the scanline technique in terms of brightness. Note, however, that the phone display had significantly lower brightness with unfilled rectangles. This is due to the smaller pixel size in the AMOLED display, which we did not account for in our data collection and those results are therefore not directly comparable.

It is encouraging that content-adaptive display driving, can make effective use of low-resolution, low-complexity passive OLED displays. At a cost of only a few dollars, they are a viable and practical opportunity for ubiquitous devices, compared to the popular high-fidelity AMOLEDs, which are significantly more expensive.

TABLE 2

Brightness Data for large unfilled rectangle
Large unfilled rectangle

|  | Scanline | Rectilinear Rendering | AMOLED |
| --- | --- | --- | --- |
| None | 5 | 180 | 2.7 |
| FDM | 4.4 | 110 | 1.9 |
| Acrylic | 4.4 | 110 | 1.8 |
| Fabric | 1.1 | 35 | 0.8 |
| Mirror | 1.4 | 30 | 1.1 |
| Wood | 0.67 | 1.1 | 0.8 |
| Veneer | 0.9 | 10 | 0.8 |

TABLE 3

Brightness Data for large filled rectangle
Large filled rectangle

|  | Scanline | Rectilinear Rendering | AMOLED |
| --- | --- | --- | --- |
| None | 130 | 3200 | 210 |
| FDM | 75 | 2000 | 210 |
| Acrylic | 100 | 2000 | 90 |
| Fabric | 30 | 640 | 32 |
| Mirror | 25 | 560 | 35 |
| Wood | 1.1 | 11 | 1.3 |
| Veneer | 8 | 170 | 10 |

TABLE 4

Brightness Data for small unfilled rectangle
Small unfilled rectangle

|  | Scanline | Rectilinear Rendering | AMOLED |
|---|---|---|---|
| None | 4 | 60 | 0.7 |
| FDM | 3 | 40 | 0.95 |
| Acrylic | 3.8 | 40 | 0.8 |
| Fabric | 1.4 | 11 | 0.6 |
| Mirror | 1.8 | 11 | 0.8 |
| Wood | 0.6 | 0.7 | 0.8 |
| Veneer | 0.8 | 3.3 | 0.77 |

TABLE 5

Brightness Data for small filled rectangle
Small filled rectangle

|  | Scanline | Rectilinear Rendering | AMOLED |
|---|---|---|---|
| None | 19 | 420 | 6.6 |
| FDM | 11 | 300 | 3.8 |
| Acrylic | 11 | 240 | 3.5 |
| Fabric | 3.5 | 70 | 1.5 |
| Mirror | 3.3 | 57 | 1.8 |
| Wood | 0.63 | 1.5 | 0.7 |
| Veneer | 1.3 | 21 | 1 |

As described above, this disclosure enables interfaces that can be embedded in traditional materials and appear on demand. The above-described subsurface interfaces may leverage parallel rendering of rectilinear, axis-aligned interface elements. This high-speed rendering technique may enable the significant brightness that may be desirable to project through the materials used to hide the display when not in use. The low-complexity optimization of widely available passive OLED displays makes this approach particularly suitable for ubiquitous and ambient computing, where scalability and cost are critical considerations. The subsurface interfaces may be implemented with different materials, such as veneer, plastics, textiles and one-way mirrors.

Accordingly, subsurface display interfaces and associated systems and methods are provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method comprising:
dividing a graphic to be displayed into a plurality of sets of primitives, each primitive of the plurality of sets of primitives comprising a rectangle or a line;
assigning a first set of primitives of the plurality of sets of primitives to a first display frame of a plurality of display frames;
assigning a second set of primitives of the plurality of sets of primitives to a second display frame of the plurality of display frames;
simultaneously using different brightness levels at least partially by outputting, at a display positioned under a transmissive material and in series, the plurality of display frames, where the outputting comprises causing the display to loop through the plurality of display frames, including the first display frame and the second display frame, wherein the looping through the plurality of display frames comprises:
responsive to a first user input, a first brightness of the first display frame is controlled so that a first portion of the graphic is output with a first brightness level; and
responsive to a second user input received while the first portion of the graphic is being output with the first brightness level, a second brightness of the second display frame is controlled so that a second portion of the graphic is output with a second brightness level while the first portion is being output with the first brightness level based on the looping;
wherein the first brightness level is different from the second brightness level.

2. The method of claim 1, wherein the display includes a passive organic light emitting diode (OLED) display.

3. The method of claim 1, wherein a quantity of display frames in the plurality of display frames is less than a quantity of rows of pixels in the display.

4. The method of claim 1, wherein outputting a particular display frame of the plurality of display frames comprises causing the display to simultaneously illuminate multiple pixels in a particular column of pixels.

5. The method of claim 1, wherein outputting a particular display frame of the plurality of display frames comprises causing the display to simultaneously:
illuminate multiple pixels in a particular column of pixels; and
illuminate pixels in multiple rows of pixels.

6. The method of claim 1, wherein outputting a single display frame takes N milliseconds, and wherein a total time used to output all of the plurality of display frames is less than N*X, where X is a quantity of rows in the display.

7. The method of claim 1, wherein a first subset of one or more display frames is output to have a third brightness level, a second subset of one or more display frames is output to have a fourth brightness level, and the third brightness level is different from the fourth brightness level.

8. A computing device comprising:
a display; and
one or more processors coupled to the display, wherein the one or more processors are configured to:
divide a graphic to be displayed into a plurality of sets of primitives, each primitive of the plurality of sets of primitives comprising a rectangle or a line;
assign a first set of primitives of the plurality of sets of primitives to a first display frame of a plurality of display frames;
assign a second set of primitives of the plurality of sets of primitives to a second display frame of the plurality of display frames; and
simultaneously using different brightness levels at least partially by outputting, at the display positioned under a transmissive material and in series, the plurality of display frames, where the outputting comprises causing the display to loop through the plurality of display frames, including the first display frame and the second display frame, wherein the looping through the plurality of display frames comprises:
responsive to a first user input, a first brightness of the first display frame is controlled so that a first portion of the graphic is output with a first brightness level; and responsive to a second user input received while the first portion of the graphic is being output with the first brightness level, a second brightness of the second display frame is controlled so that a second portion of the graphic is output with a second brightness level while the first portion is being output with the first brightness level based on the looping, wherein the first brightness level is different from the second brightness level.

9. The computing device of claim 8, wherein the display includes a passive organic light emitting diode (OLED) display.

10. The computing device of claim 8, wherein a quantity of display frames in the plurality of display frames is less than a quantity of rows of pixels in the display.

11. The computing device of claim 8, wherein outputting a particular display frame of the plurality of display frames comprises causing the display to simultaneously illuminate multiple pixels in a particular column of pixels.

12. The computing device of claim 8, wherein outputting a particular display frame of the plurality of display frames comprises causing the display to simultaneously:

illuminate multiple pixels in a particular column of pixels; and illuminate pixels in multiple rows of pixels.

13. The computing device of claim 8, wherein outputting a single display frame takes N milliseconds, and wherein a total time used to output all of the plurality of display frames is less than N*X, where X is a quantity of rows in the display.

14. A non-transitory, computer-readable medium containing computer executable instructions that, when executed by a processor, cause the processor to execute a method, the method comprising:

dividing a graphic to be displayed into a plurality of sets of primitives, each primitive of the plurality of sets of primitives comprising a rectangle or a line;

assigning a first set of primitives of the plurality of sets of primitives to a first display frame of a plurality of display frames;

assigning a second set of primitives of the plurality of sets of primitives to a second display frame of the plurality of display frames; and simultaneously using different brightness levels at least partially by outputting, at a display positioned under a transmissive material and in series, the plurality of display frames, where the outputting comprises causing the display to loop through the plurality of display frames, including the first display frame and the second display frame, wherein the looping through the plurality of display frames comprises:

responsive to a first user input, a first brightness of the first display frame is controlled so that a first portion of the graphic is output with a first brightness level; and responsive to a second user input received while the first portion of the graphic is being output with the first brightness level, a second brightness of the second display frame is controlled so that a second portion of the graphic is output with a second brightness level while the first portion is being output with the first brightness level based on the looping, wherein the first brightness level is different from the second brightness level.

15. The non-transitory, computer-readable medium of claim 14, wherein the display includes a passive organic light emitting diode (OLED) display.

16. The non-transitory, computer-readable medium of claim 14, wherein a quantity of display frames in the plurality of display frames is less than a quantity of rows of pixels in the display.

17. The non-transitory, computer-readable medium of claim 14, wherein outputting a particular display frame of the plurality of display frames comprises causing the display to simultaneously illuminate multiple pixels in a particular column of pixels.

18. The non-transitory, computer-readable medium of claim 14, wherein outputting a particular display frame of the plurality of display frames comprises causing the display to simultaneously:

illuminate multiple pixels in a particular column of pixels; and illuminate pixels in multiple rows of pixels.

19. The non-transitory, computer-readable medium of claim 14, wherein outputting a single display frame takes N milliseconds, and wherein a total time used to output all of the plurality of display frames is less than N*X, where X is a quantity of rows in the display.

* * * * *